(12) United States Patent
Mosallaei

(10) Patent No.: US 7,750,869 B2
(45) Date of Patent: Jul. 6, 2010

(54) DIELECTRIC AND MAGNETIC PARTICLES BASED METAMATERIALS

(75) Inventor: Hossein Mosallaei, Brookline, MA (US)

(73) Assignee: Northeastern University, Boston, MA (US)

( * ) Notice: Subject to any disclaimer, the term of this patent is extended or adjusted under 35 U.S.C. 154(b) by 224 days.

(21) Appl. No.: 12/220,438

(22) Filed: Jul. 24, 2008

(65) Prior Publication Data

US 2009/0040131 A1 Feb. 12, 2009

Related U.S. Application Data

(60) Provisional application No. 60/961,818, filed on Jul. 24, 2007.

(51) Int. Cl.
*H01Q 15/02* (2006.01)
*H01Q 1/00* (2006.01)

(52) U.S. Cl. .................................. 343/911 R; 343/787

(58) Field of Classification Search .......... 343/700 MS, 343/787, 911 R
See application file for complete search history.

(56) References Cited

U.S. PATENT DOCUMENTS 6,797,401 B2 * 9/2004 Herron ....................... 428/553
6,958,729 B1 * 10/2005 Metz ..................... 343/700 MS
7,177,513 B2 * 2/2007 Povinelli et al. ............. 385/129
7,256,753 B2 * 8/2007 Werner et al. ............... 343/909
2008/0258981 A1 * 10/2008 Achour et al. .............. 343/702

OTHER PUBLICATIONS

Ahmadi and Mosallaei; "Physical configuration and performance modeling of all-dielectric metamaterials"; Physical Review B; (2008); 77: 045104-1-11.

Mosallaei, "Broadband Characterization of Complex Periodic EBG Structures: An FDTD/Prony Technique Based on the Split-Field Approach"; Electromagnetics; (2003); 23: 135-151.

* cited by examiner

*Primary Examiner*—Hoang V Nguyen
(74) *Attorney, Agent, or Firm*—Weingarten, Schurgin, Gagnebin & Lebovici LLP

(57) ABSTRACT

RF-optical metamaterials with ($\pm\epsilon$, $\pm\mu$) figures-of-merit of interest are constructed from coupled magnetic and dielectric multi-resonant multi-disks (finite-size cylinders) or multi-sphere lattices arranged in a periodic or a random fashion to offer tailored magnetic and electric dipole moments. The present metamaterials include embedded particles arrays that provide coupled magnetic and electronic modes equivalent to L (inductor) and C (capacitor) circuit models. Novel arrangements of these dipole modes (L and C) tailor the transfer function to the physics of interest.

50 Claims, 9 Drawing Sheets

DIELECTRIC AND MAGNETIC PARTICLES BASED METAMATERIALS

CROSS REFERENCE TO RELATED APPLICATIONS

This application claims the benefit of U.S. Provisional Application No. 60/961,818, entitled "RF-Optical Magneto-Electric Metamaterials" filed Jul. 24, 2007, the entire teachings of which are incorporated herein by reference.

STATEMENT REGARDING FEDERALLY SPONSORED RESEARCH OR DEVELOPMENT

This invention was supported in whole or in part by the U.S. Air Force Office of Scientific Research (AFOSR) under Grant No. FA9550-07-1-0133. The Government may have certain rights in this invention.

BACKGROUND OF THE INVENTION

Metamaterials are receiving increasing attention in the scientific community in recent years due to their exciting physical properties and novel potential applications. Metamaterials can be engineered to exhibit negative permittivity and negative permeability over a given frequency range, and thereby provide negative refraction (NR). This can provide a number of benefits in the RF and optical fields.

Most of the previous metamaterial designs have utilized metallic elements, which are very lossy, have very narrow bandwidth, are anisotropic, are not conformal, and are almost impossible to realize for RF and optical devices. The prior techniques also require periodicity as the key to the performance, and this can increase the difficulty of fabrication. Furthermore, one generally needs to establish a large size structure in order to achieve the performance of interest.

SUMMARY OF THE INVENTION

RF-optical metamaterials with ($\pm\epsilon$, $\pm\mu$) figures-of-merit of interest are constructed from coupled magnetic and dielectric multi-resonant multi-disks (finite-size cylinders) or multi-sphere lattices arranged in a periodic or a random fashion to offer tailored electric and magnetic dipole moments. The present metamaterials include embedded particle arrays that provide coupled electronic and magnetic modes equivalent to L (inductor) and C (capacitor) circuit models. Novel arrangements of these dipole modes (L and C) tailor the transfer function to the physics of interest.

The present metamaterials are based on dielectric and magnetic configurations, and offer electric and magnetic dipole moments as the alphabets for metamaterial development. Tailoring the electric and magnetic dipole moments in the array allows one to obtain any permittivity and permeability of interest. The present metamaterial arrays also require a small dielectric contrast with the host matrix, and are characterized by low-loss, wideband performance. The metamaterial arrays of the invention provide the required permittivity and permeability of interest, at any desired frequency, and can be utilized in numerous RF and optical applications.

An advantage of the present metamaterials is that they can be constructed from readily-available and, in general, naturally occurring materials, making the devices eminently practical. In one aspect, the metamaterials are comprised of set(s) of dielectric and/or magnetic particles embedded in a host matrix, wherein the dielectric constants of the particles are less than about 120.

According to one embodiment, two sets of dielectric particles (e.g., spheres or disks) are embedded in a low dielectric host matrix. One sphere offers magnetic resonance and the other sphere offers electric resonance. Above the resonances, negative $\epsilon$ and negative $\mu$ metamaterial properties are achieved. Dielectric materials are free of conduction loss and this will offer low-loss metamaterial.

In other embodiments, one set of magneto-dielectric particles (e.g., spheres or disks) embedded in a host matrix provides negative e and negative p metamaterial properties.

In another embodiment, a set of dielectric particles (e.g., spheres or disks) is embedded in a host ferrite matrix operating above its resonance to provide a double negative (DNG) metamaterial. A dc magnetic bias can be applied to tune the resonance of the ferrite and thereby adjust the metamaterial properties of the array. Also, one can use a multiferroic material instead of a hexaferrite (or a ferrite) to achieve the same magnetic property of interest, but now the performance can be simply and effectively tuned by applying a dc electric bias (instead of applying a dc magnetic bias).

In still another embodiment, a set of hexaferrite particles (e.g., spheres or disks) is embedded in a host low-dielectric background matrix to provide a metamaterial with negative effective permittivity and permeability. In this embodiment, the resonance of the hexaferrite particles can be tuned by a dc magnetic bias to adjust the metamaterial properties. Also, one can use a multiferroic material instead of hexaferrite to achieve the same magnetic property of interest, but in this case the performance can be simply and effectively tuned by applying a dc electric bias.

An array of coupled gallium phosphide (GaP) semiconductor particles (e.g., spheres or disks) can be embedded in a low dielectric host matrix to provide a metamaterial in the optical range. The GaP particles provide magnetic mode (L) while their couplings provide electric performance (C). The array is configured so that the electric and magnetic resonance occur around the same frequency band, and above that a backwards medium is achieved. Applying light to the GaP semiconductor particles can change their material properties, thus changing or tuning the metamaterial performance (i.e. tunable backward wave optical metamaterial).

Increasing the couplings of the embedded dielectric and magnetic particles by bringing them close to each other enhances the bandwidth of the metamaterial permittivity and permeability properties. Also, using multi-resonant particles in one unit cell allows wideband metamaterial characteristics, similar to the wideband LC circuits in filter theory.

In certain embodiments, the metamaterials of the present invention offer tunable tailored electric and magnetic dipole moments which are isotropic, have very small loss, are conformal, have wide material bandwidth, have optimized shape, require small dielectric contrasts with the host matrix, and can be fabricated using stereolithography in the microwave range and two-photon lithography and self-assembly in the optical range.

DETAILED DESCRIPTION OF THE INVENTION

Figure 1:
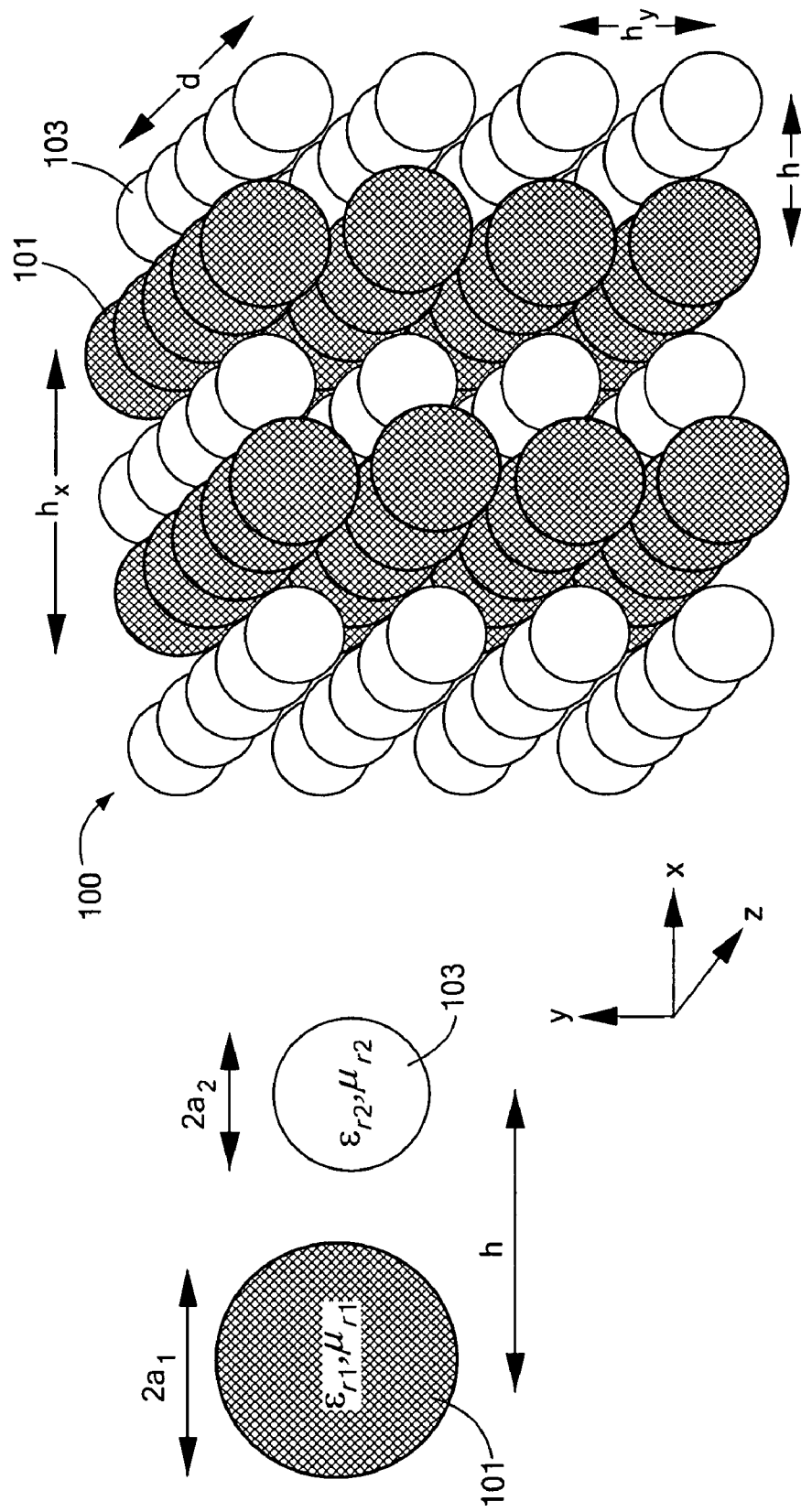
FIG. 1 illustrates the geometry of a metamaterial array comprising two sets of dielectric spheres.

In a first embodiment, as shown in FIG. 1, two sets of dielectric particles 101 and 103 are embedded in a host matrix 105. In this embodiment, the particles 101 and 103 are spherical particles, though it will be understood that they can be any suitable shape. A metamaterial according to this embodiment comprises a 3D array of dielectric spheres with a pair of different spheres 101, 103 acting as a unit-cell building block. Sphere 101 is characterized by a dielectric constant $\in_{r1}$ and a radius $a_1$, and sphere 103 is characterized by a dielectric constant $\in_{r2}$ and a radius $a_2$. One sphere in the unit-cell provides electric resonance and the other sphere offers magnetic resonance. Above the resonances, negative ∈ and negative μ metamaterial properties are achieved. An interlocking lattice of spheres 101 and 103 in host matrix 105 forms a 3D metamaterial array 100.

To obtain backward wave and double negative (DNG) behaviors, the appropriate electric and magnetic dipole moments are created in a one unit-cell array configuration. In general, the goal is to establish both electric and magnetic resonances around the same frequency band. Although the scattering electric (magnetic) resonances of a 3D array of dielectric spheres is different from the resonances associated with electric (magnetic) Mie scattering coefficients of a single sphere, still the resonances of a single sphere's Mie scattering coefficients can successfully predict the electric (magnetic) resonances of a 3D array of dielectric spheres. Thus, given the design of the first set of spheres 101, it is sufficient to choose the parameters of the second set of spheres 103 such that the resonances of the Mie scattering coefficients for the two sets occur around the same frequency region. The important parameters to be considered for each set of particles include the particle size (e.g., the radius in the case of spheres) and the dielectric constant of the material.

An advantage of the present invention is that negative ∈ and negative μ metamaterial properties can be obtained using readily-available dielectric materials. In a preferred embodiment, the particles 101, 103 are made from materials having relatively high dielectric constants (e.g., ∈~100), and are embedded in a low dielectric matrix (e.g., ∈~1). Naturally-occurring dielectrics having ∈ values up to about 120 are suitable for the present metamaterial. In general, the high dielectric particles have ∈ values greater than about 40. It is noted that the dielectric particles have very low-loss characteristic offering high-performance metamaterial.

By bringing the particles 101, 103 closer together in the matrix 105, the coupling between particles is increased, thus increasing the material frequency bandwidth and enhancing metamaterial performance.

A 3D array configuration of dielectric particles, such as shown in FIG. 1, provides isotropic metamaterial performance.

Figure 2:
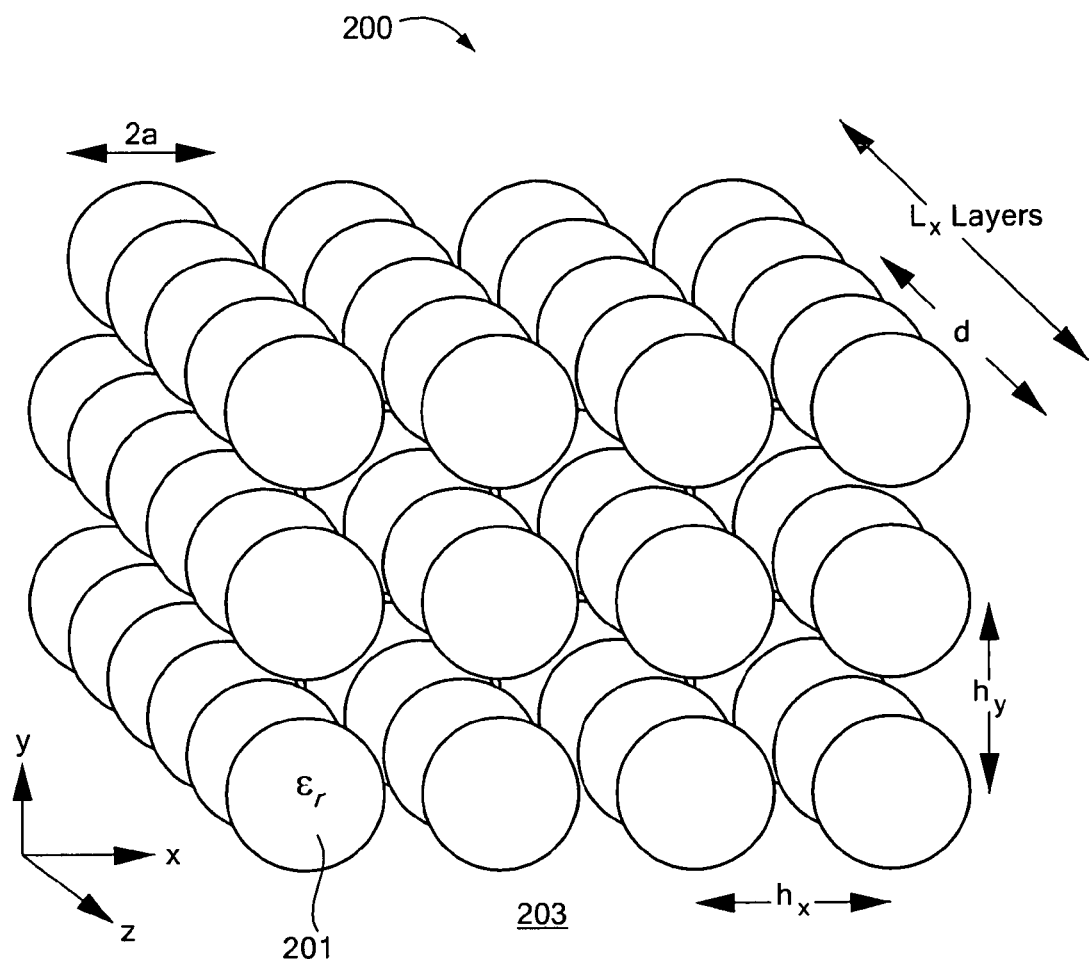
FIG. 2 is a schematic diagram of a metamaterial array comprising one set of dielectric spheres.

FIG. 2 illustrates a second embodiment of a dielectric metamaterial array 200. In this embodiment, a single set of identical dielectric particles, which in this case are spheres 201, is embedded in a low-dielectric (e.g., ∈~1) matrix 203. The spheres 201 have a relatively low dielectric constant (e.g., ∈~12.5), and are preferably comprised of gallium phosphide (GaP). The spheres are configured to operate in their magnetic resonances where their couplings offer electric resonances (i.e., LC-type circuit model). Combination of the electric and magnetic modes provides backward wave material, including in the optical region. The structure can be electronically tuned by properly shining the light on GaP spheres.

According to yet another embodiment, a metamaterial array comprises a single set of hexaferrite particles embedded in a host low dielectric background matrix. The array can be configured similar to the GaP array of FIG. 2, though the embedded particles (e.g., spheres) are comprised of a hexaferrite material with ∈~20 and μ~5. Such an array can provide the frequency bands (near the resonances of these spheres) in which the bulk permittivity and permeability are negative. This embodiment is advantageous for metamaterial performance in the GHz range. The hexaferrite particles metamaterial structure can be tuned by applying a DC magnetic bias. One can also use multiferroic particles instead of the hexaferrite particles to achieve the same desired performance, but now the structure can be tuned by applying a DC electric bias.

According to yet another embodiment, a metamaterial array comprises a set of relatively high-dielectric particles (e.g., ∈~100) embedded in a host ferrite matrix operating above its material resonance and providing negative permeability. The array can be configured similar to the array of FIG. 2, and the dielectric particles can comprise spheres. The host ferrite background provides negative permeability and the set of dielectric spheres can electric resonant modes, where above the resonance negative effective permittivity is obtained. The array thus provides a double negative (i.e., negative ∈, negative μ) metamaterial.

In the above embodiments in which natural magnetic, ferrite, and/or hexaferrites are involved, one advantage is that the metamaterial is tunable. By applying a DC magnetic bias to the array, the ferrite resonant frequency can be tuned to adjust the metamaterial performance. One can also integrate multiferroic materials instead of the hexaferrites (or ferrites) to offer multifunctional tunable metamaterials by applying a DC electric field.

Figure 3:
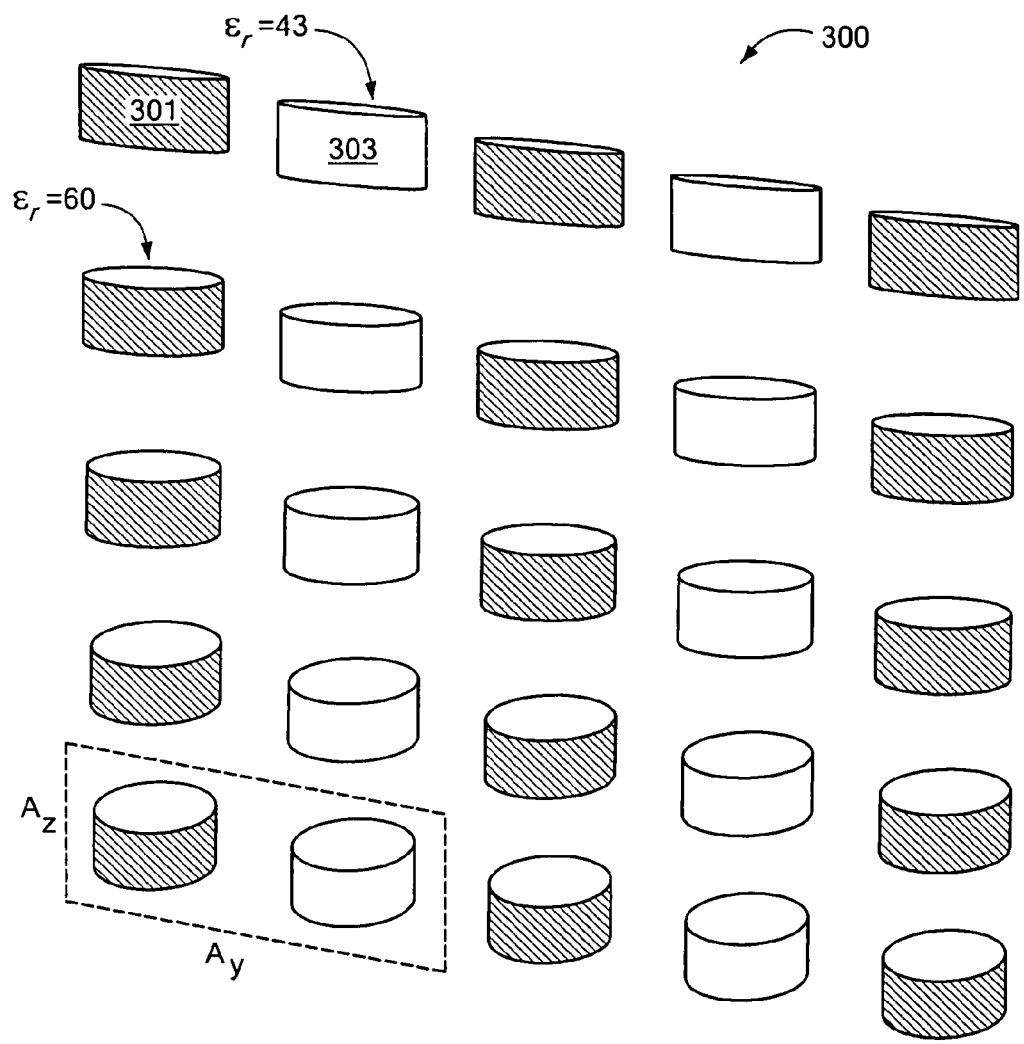
FIG. 3 shows a metamaterial array comprising all-dielectric disks.

In any of the above-described embodiments, it will be understood that the sets of particles embedded in the host matrix can have any desired shape, including, for example, disks, cubes and any arbitrary shape. For example, FIG. 3 illustrates an embodiment of a DNG metamaterial array 300 comprising all-dielectric disks 301, 303, which might be easier for fabrication in some cases.

Figure 10:
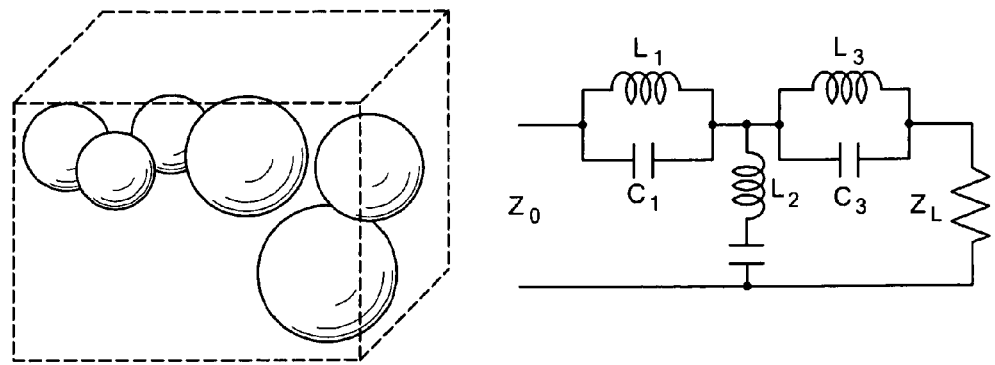
FIG. 10 illustrates multi-resonant spheres in a unit cell of a metamaterial and the equivalent circuit model.
Figure 11:
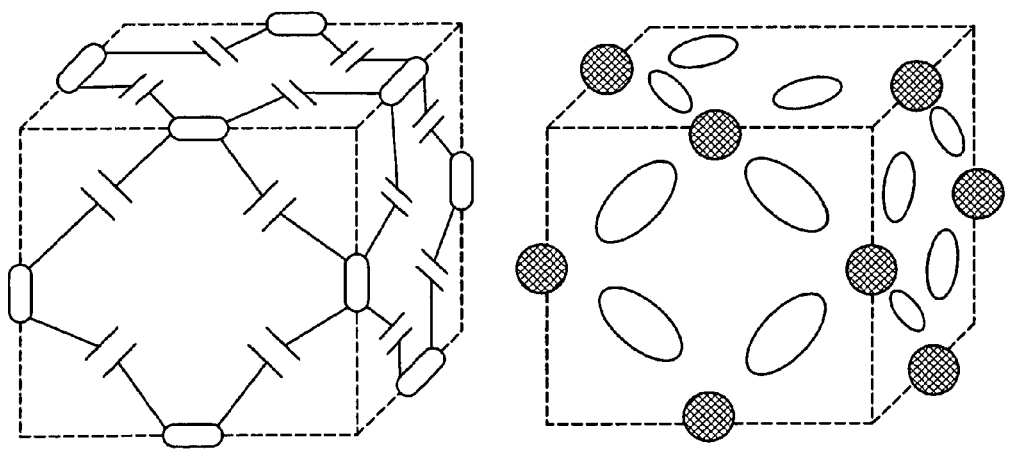
FIG. 11 illustrates the RLC circuit model realized by an array of arbitrary shape and materials (dielectric and magnetic) particles.

Also, using multi-resonant particles in one unit cell allows wideband metamaterial characteristics, similar to the wideband LC circuits in filter theory. FIG. 10 illustrates an example of multi-resonant spheres in a unit cell of a metamaterial and the equivalent circuit model. This can enhance the bandwidth characteristics of the metamaterial.

According to another aspect, the dielectric and magneto-dielectric (or hexaferrite or multiferroic particles) in their electric or magnetic resonant modes can be envisioned as the C and L circuit elements of an electronic circuit. The loss can be represented as R. Novel combinations of particles in a unit-cell can enable novel metamaterial performance characteristics. As with R, L, and C circuit elements, one can design any circuit configuration with required transfer functions, arranging dielectric and magnetic particles in a unit-cell in novel fashions to tailor unique metamaterial characteristics. In other words, the sphere particles (or other shapes) can be utilized to realize R, L, and C circuit model physics, where their novel combinations offers desired functionalities. The concept of circuit theory can be used to achieve novel metamaterials using novel particles arrangements in one unit-cell. An example of the RLC circuit model that can be used to design an equivalent-performance metamaterial array having (arbitrary) shape and materials particles (e.g., dielectric and magnetic) is illustrated in FIG. 10.

Figure 4A:
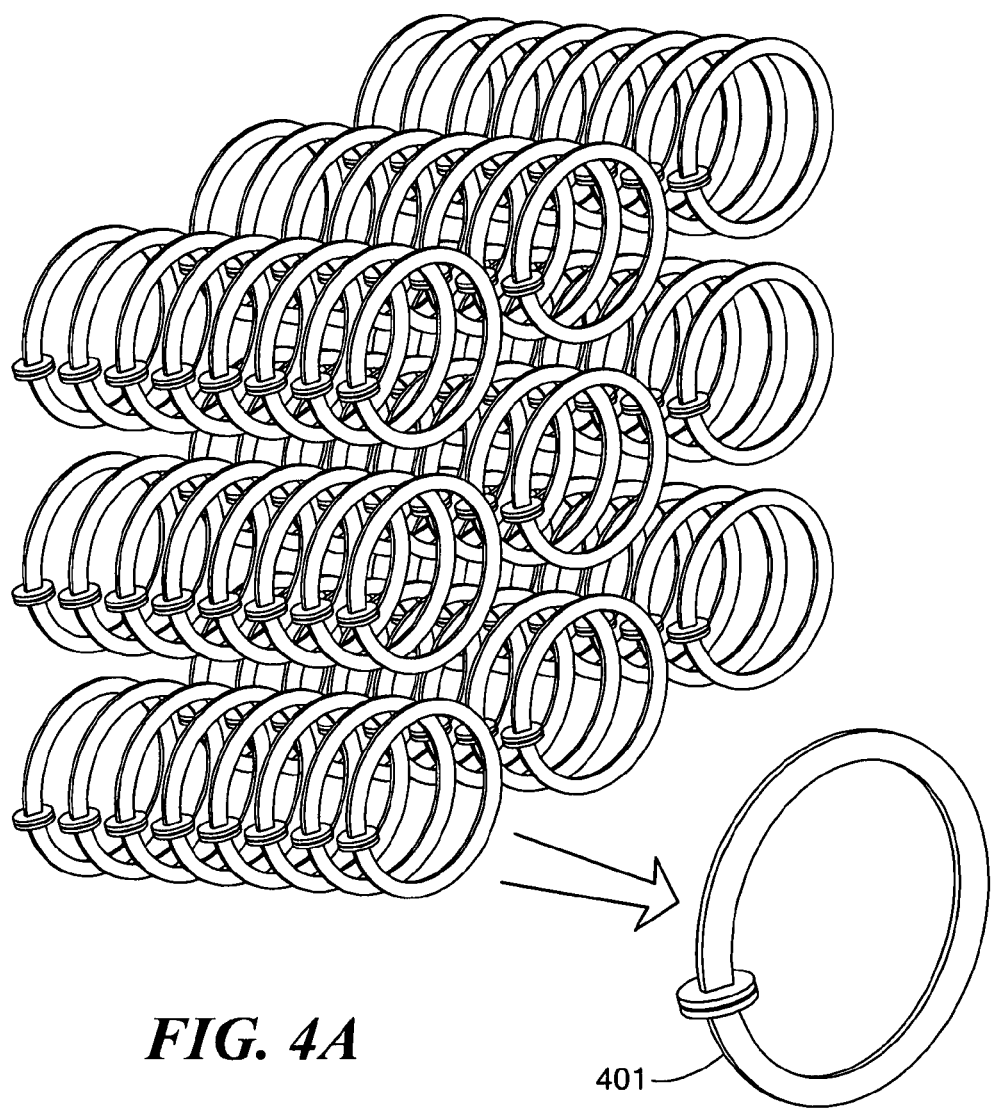
FIG. 4A illustrates a periodic configuration of metallic resonant loop circuits offering negative $\mu$.
Figure 4B:
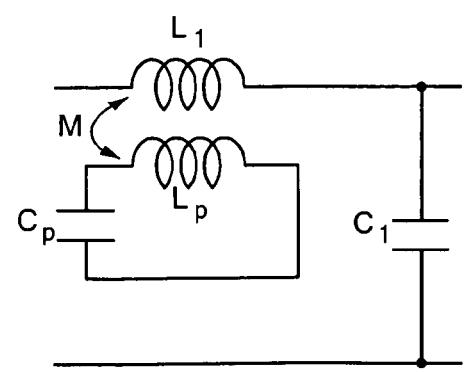
FIG. 4B shows the equivalent circuit model for FIG. 4A.
Figure 5:
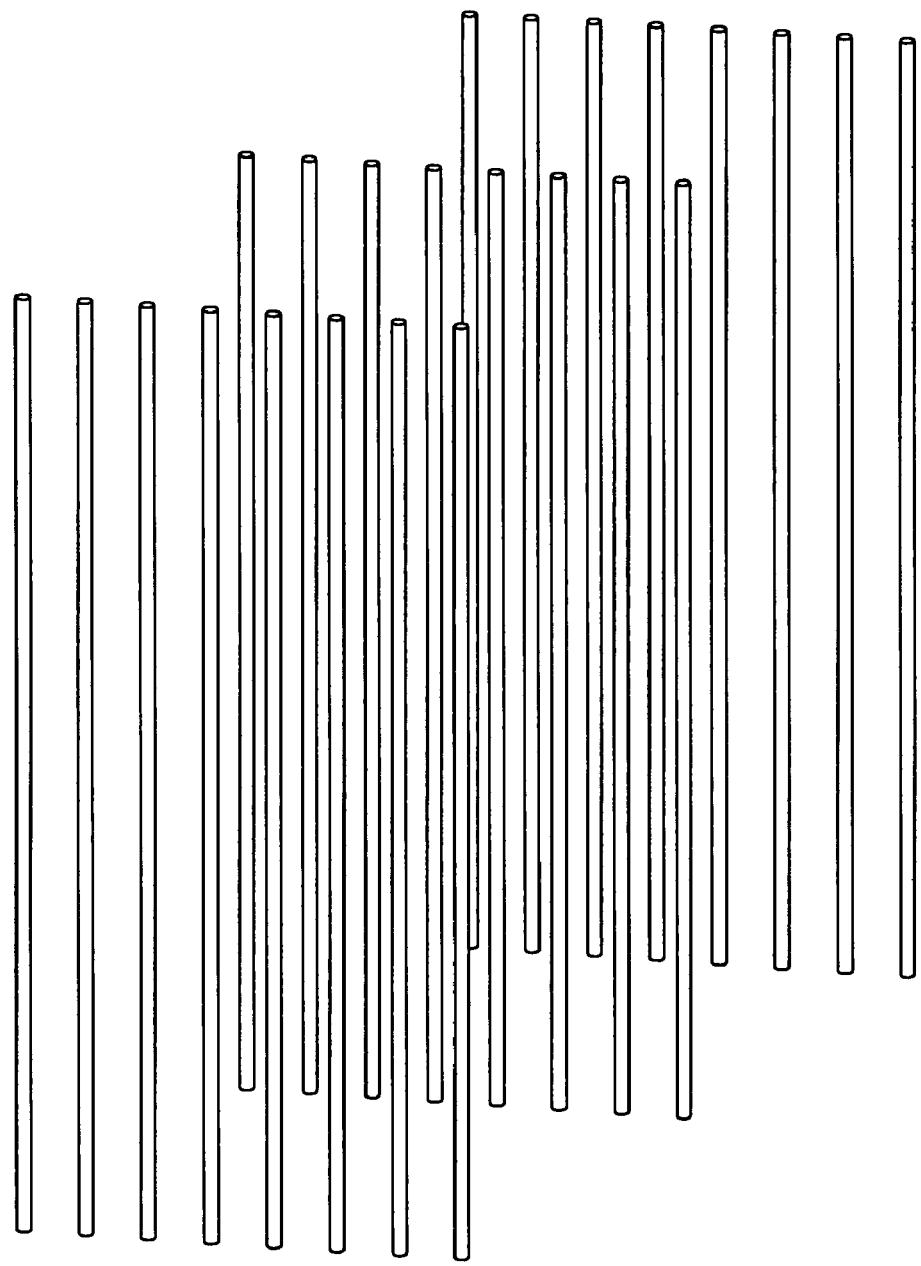
FIG. 5 illustrates negative ∈ periodic wires.
Figure 6:
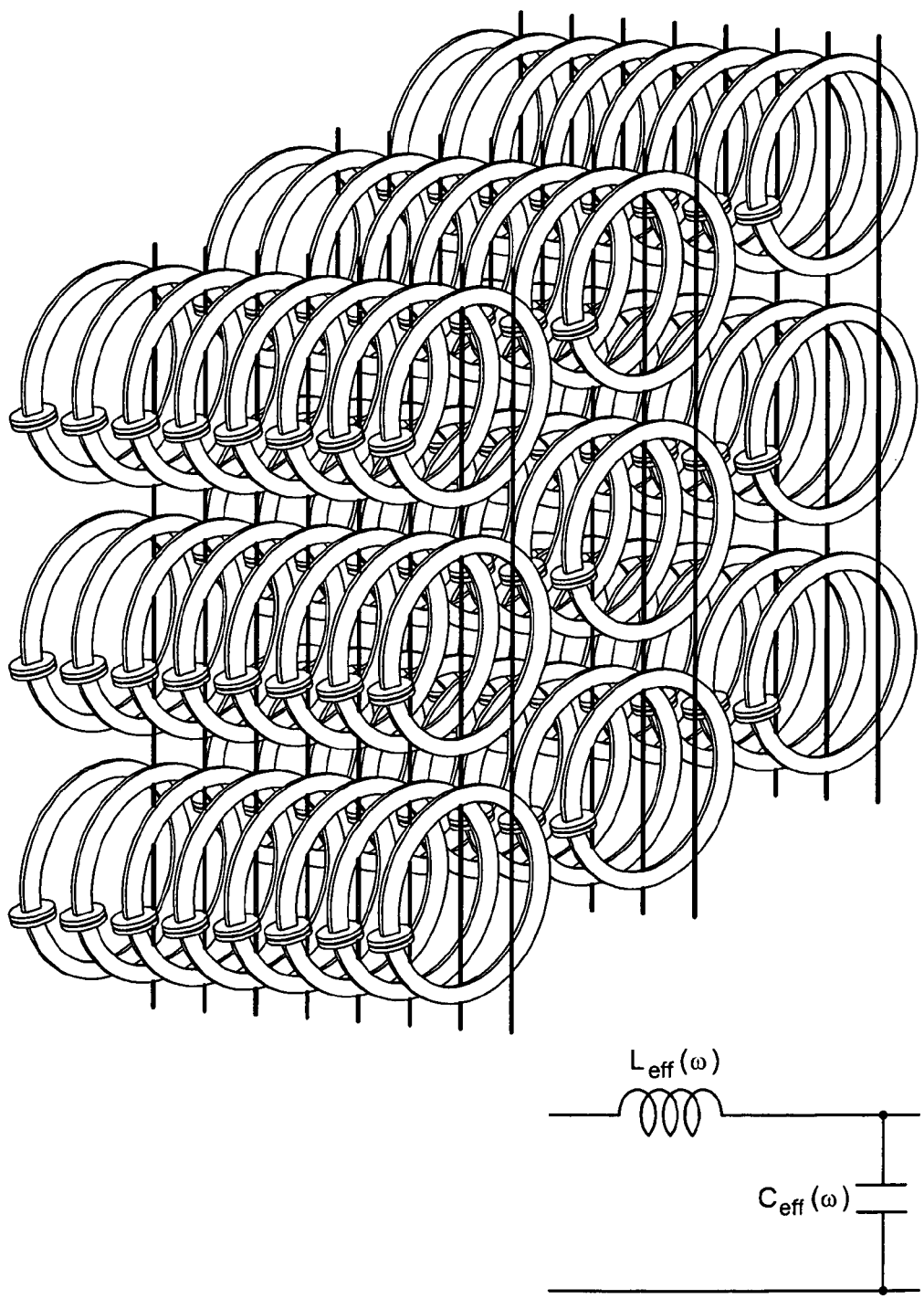
FIG. 6 illustrates a metallic DNG medium and its equivalent circuit model.

To better understand the principles of the present metamaterials, reference is made to FIG. 4A, which illustrates a periodic configuration of metallic resonant LC loop circuits 401, as is typically used for proving artificial permeability ($\mu$) performance. The loops respond magnetically to the excitation, an one can obtain an equivalent circuit model for the periodic structure as shown in FIG. 4B. An inductive coupling is obtained which results in an effective inductance ($L_{eff}$) or equivalently resonant $\mu$ behavior. A periodic array of wires such as shown in FIG. 5 can be used to produce the capacitive coupling and thus the negative $\in$ behavior. Combining these two structures, one can obtain a metamaterial with double negative (DNG) parameters ($L_{eff}$-$C_{eff}$) above the resonance of the geometry. An example of a metallic DNG medium and its equivalent circuit model are illustrated in FIG. 6. The major issues with this type of design are the narrow bandwidth behavior of the loops and the existence of a large conduction loss, that make the use of this type of metamaterial difficult or impossible for many applications.

Figure 7A:
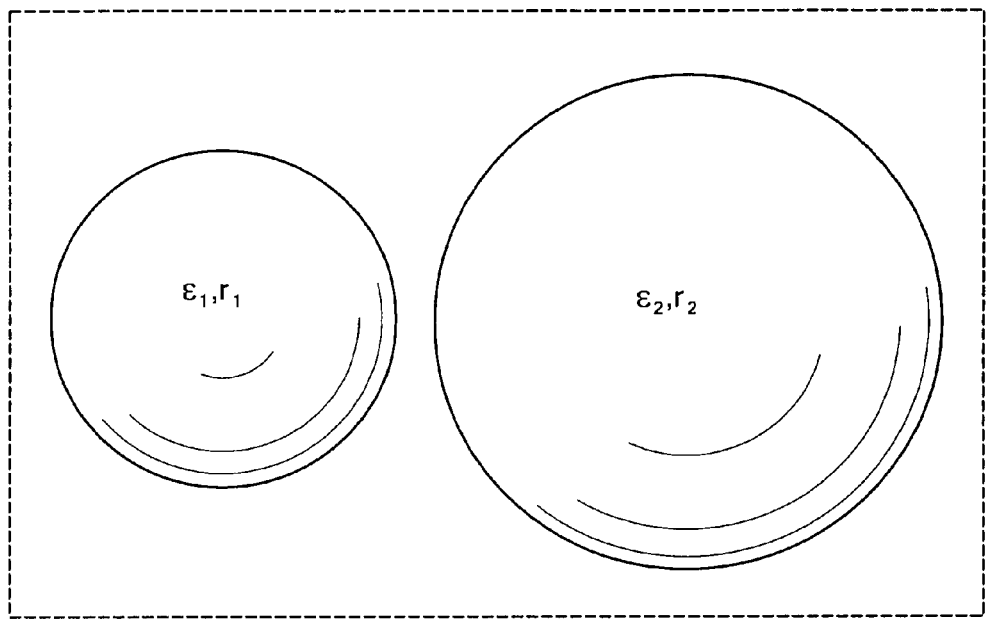
FIG. 7A depicts a pair of dielectric spherical particles.
Figure 7B:
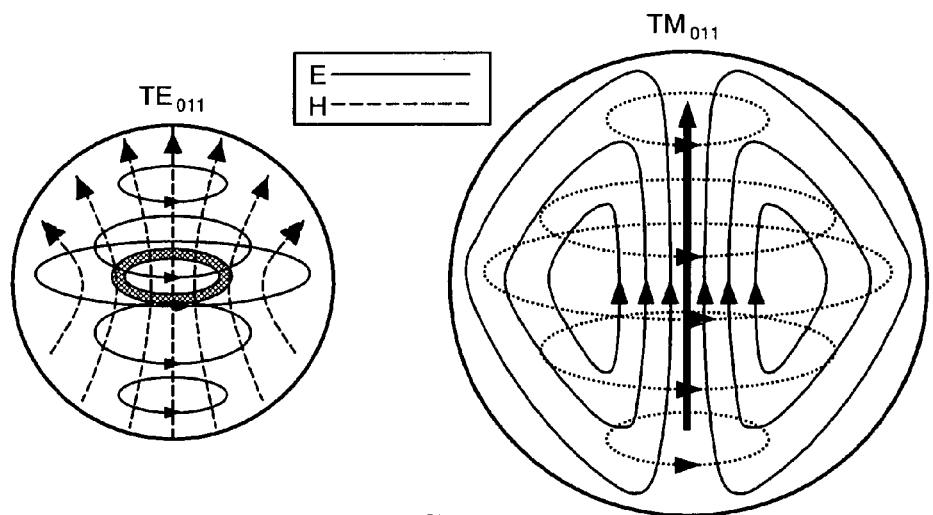
FIG. 7B shows the dominant resonant modes of the particles of FIG. 7A.

According to one aspect of the invention, the present invention is able to achieve the desirable ($\pm\in$, $\pm\mu$) material parameters using dielectric-only materials with enhanced bandwidth and less loss characteristics. As an example, considering a sphere of a dielectric material, using the Mie theory, scattered electromagnetic fields from the sphere can be expressed as an infinite series of vector spherical harmonics, $M_n$ and $N_n$, each weighted by appropriate amplitude coefficients, $a_n$ and $b_n$, equivalent to a superposition of electric and magnetic dipoles and multipoles. If the dielectric constant of the sphere is relatively larger than the host material in which it is located, then the dipole fields dominate ($a_1$ and $b_1$). For an electrically small dielectric sphere, only electrical polarization exists and $b_1$ (the weighting coefficient for magnetic dipole) is close to zero (no magnetization). However, as soon as the sphere becomes comparable to the dielectric wavelength, an equivalent current circulation around the sphere is generated, representing a magnetic dipole moment. Thus, a structure of two lattices of high dielectric spherical particles, as depicted in FIG. 1, has the potential of successfully presenting a magnetic dipole (resonant $TE_{011}$ mode in one sphere) and an electric dipole (resonant $TM_{011}$ mode in another sphere) at the same given frequency. The field behaviors are illustrated in FIG. 7 to further clarify this concept.

Figure 8:
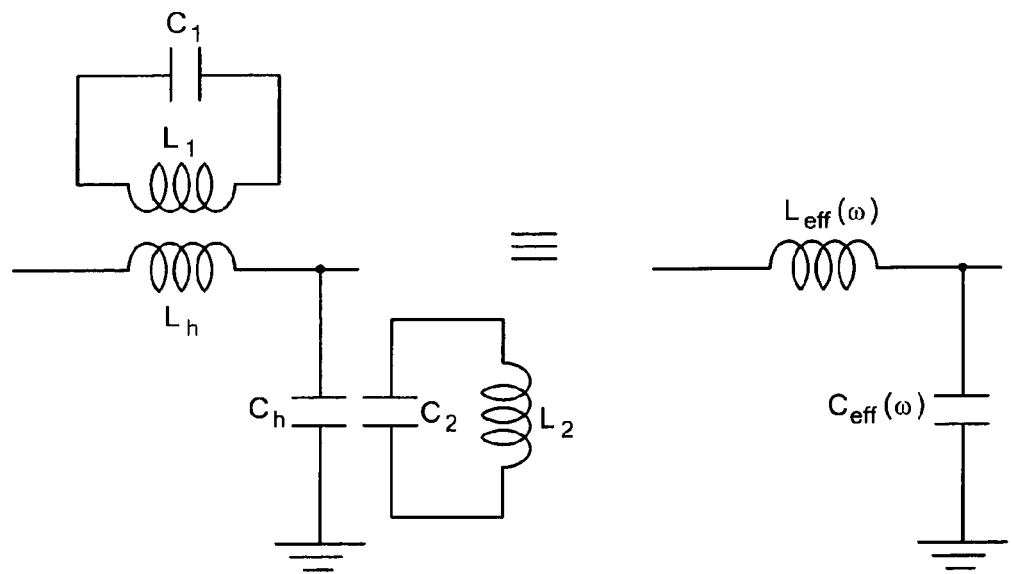
FIG. 8 shows the equivalent circuit model for an all-dielectric metamaterial.

As a result, as illustrated in FIG. 1, a medium 100 that comprises periodic lattices of spheres 102 and 103 embedded in a host matrix 105 ($\in_h$) provides both magnetic and dielectric polarizabilities, without using any metal or magnetic inclusions. The equivalent circuit model (i.e., inductive and capacitive couplings) for the geometry is shown in FIG. 8. By tuning the material parameters and the radii of the spheres, the metamaterial ($\in_{eff}$, $\mu_{eff}$) constitutive parameters can be successfully tailored.

The effective parameters can be estimated as:

$$\varepsilon_{eff} = \varepsilon_h \left( 1 + \frac{3v_{f2}}{\frac{F(\theta_2) + 2b_2}{F(\theta_2) - b_2} - v_{f2}} \right) \quad (1)$$

$$\mu_{eff} = \mu_0 \left( 1 + \frac{3v_{f1}}{\frac{F(\theta_1) + 2}{F(\theta_1) - 1} - v_{f1}} \right) \quad (2)$$

$$F(\theta) = \frac{2(\sin\theta - \theta\cos\theta)}{(\theta^2 - 1)\sin\theta + \theta\cos\theta} \quad (3)$$

Where $\theta_i = k_0 r_i \sqrt{\in_{ri}}$, (i=1,2), $b_2 = \in_h/\in_2$, and $v_{fi}$ is the volume mixture fraction of the ith particle. From Equations (1), (2) and (3), one can readily obtain the multiple-regions for ($\pm\in$, $\pm\mu$) material behaviors.

The above equations are obtained with the assumptions that the spheres have much larger dielectrics than that of the host material and that the waves are completely confined within the particles realizing dipole moments. However, in practice, one should determine how large the dielectric constants should be for the successful demonstration of the desired behaviors. To fully investigate and understand the EM behaviors of the periodic (or randomly located) dielectric spheres having arbitrary permittivity values, one can apply an integral equations method with Mie series for equivalent surface currents representation and additional theorems in spherical coordinates for applying the boundary conditions. For a random arrangement, the Clausius-Mossotti technique is involved to account for the statistical distribution of spheres. To achieve the field equivalence, a layer of equivalent surface electric current, of density $J_s$, and a layer of surface magnetic current of density $M_s$, are placed on the boundary surface of each sphere with the objective to produce total zero field in the remaining space. These current densities are given by:

$$J_s \hat{n} \times H, M_s = E \times \hat{n} \quad (4)$$

The scattered electric and magnetic fields can be expressed in terms of currents as:

$$E = L^e(J_s) + K^e(M_s), H = L^h(J_s) + K^h(M_s) \quad (5)$$

where $L^e$, $K^e$, $L^h$ and $K^h$ are linear integro-differential operators that include the dyadic Green's functions. Boundary conditions on the surface of the nth sphere can be written as:

$$\sum_{k=1}^{N} [L^e(J_s^k) + K^e(M_s^k)]_t^{outside} + (E_i)_t^{outside} = [L^e(-J_s^n) + K^e(-M_s^n)]_t^{inside} \quad (6a)$$

$$\sum_{k=1}^{N} [L^h(J_s^k) + K^h(M_s^k)]_t^{outside} + (H_i)_t^{outside} = [L^h(-J_s^n) + K^h(-M_s^n)]_t^{inside} \quad (6b)$$

The electric and magnetic currents can be expanded in terms of Mie basis functions, and then the boundary conditions can be successfully transformed into the matrix equations by applying the additional theorems in spherical coordinates. The solution of the matrix equations provides a comprehensive understanding of the metamaterial with tailored material characteristics ($\pm\in$, $\pm\mu$).

It can be determined how the shape and configuration of the resonators affects the formation of electric and magnetic dipoles. In other words, it can be determined what the optimal configuration of resonators should be to offer less dielectric contrast requirements for appropriate formation of dipole moments. This is very advantageous for the fabrication process, particularly for metamaterials in the optical range, where low-loss high-permittivity optical materials may not be easily achievable. In the terahertz (THz) range, the plasmonic materials provide negative permittivity, which adds another freedom in the design process. For example, a sphere comprised of a regular low dielectric $\in$ and a $-\in$ plasmonic material can effectively provide a very high positive $\in$, that can be used for achieving the required TE or TM resonant modes. The $-\in$ for a metallic plasmonic particle can be achieved in a region close to the plasma frequency of the material where it shows a relatively wide bandwidth and very low loss behavior (acting like a low loss dielectric).

Since the couplings between the resonators are also taken into account in the formulation, one can effectively investigate novel configurations or arrangements of resonators in one unit cell, offering improved metamaterial characteristics. For example, it has been demonstrated that the bandwidth of a metallic metamaterial can be successfully enhanced utilizing a building block unit cell constructed of three metallic loops with different resonant frequencies (similar to the filter theory concept where series-parallel-series resonant LC circuits offer a wideband behavior). This idea can also be applied to an all-dielectric resonator design. As shown in FIG. 8, the dielectric resonators are equivalent to LC resonant circuits. Using filter theory, a pass-band LC circuit can be designed to satisfy the desired requirements. Then, the equivalent dielectric resonator for each of the LC resonators can be determined. Finally, the resonators can be combined in a proper way to model the designed wideband circuit. As another example, using the same approach, a C-L transmission line with a negative refractive index can be modeled with dielectric/plasmonic resonators to provide a medium with n=−1. The present technique is very general and can include a frequency dispersive plasmonic particle as one of the elements in the design space. The design of optical nano-circuit elements (L−C) can also be addressed utilizing the present method.

As there is no conduction loss, the dielectric metamaterial provides improved efficiency. Also, the system has an isotropic property. In addition, conformal metamaterials can be realized using this type of design.

Figure 9:
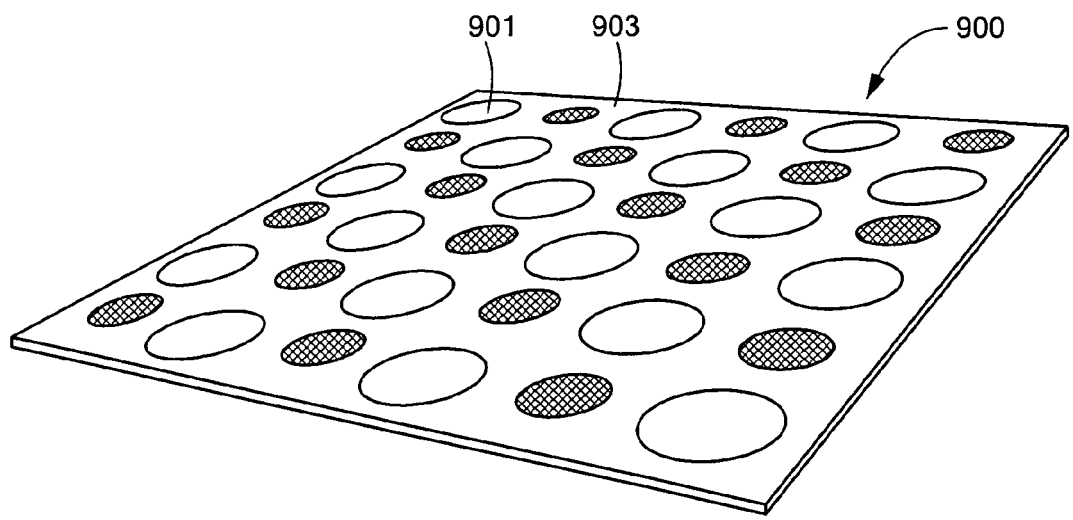
FIG. 9 illustrates a two-dimensional (2D) metamaterial.

Turning now to FIG. 9, a two-dimensional (2D) metamaterial 900 according to one aspect of the invention is illustrated. The 2D metamaterial 900 comprises a plurality of high-dielectric disks 901 embedded in a host medium 903. A 2D metamaterial can be easier to fabricate than a three-dimensional structure, though similar behavior as the 3D case can be expected. To analyze this structure, a higher-order large-domain integral-equation technique is implemented with generalized curvilinear quadrilateral and hierarchical divergence-conforming polynomial vector basis functions for the approximation of equivalent electric and magnetic surface currents. This technique decouples the total computational domain into cylinders representing the perforations and the remaining part of the slab. It introduces special polynomial/exponential entire-domain basis functions for equivalent surface electric and magnetic currents over the sides and bases of cylinders, and assumes the dielectric slab to be infinite taking it into account exactly by considering the corresponding dyadic Green's function. This method is extremely capable and efficient for modeling the 2D metamaterial. This approach can be used to fully investigate the electric and dielectric magnetic dipoles of disks, the results can be integrated into novel designs for all-dielectric 2D metamaterials with tailored effective parameters.

A computation/optimization engine based on a finite difference time domain-piecewise linear recursive convolution (FDTD-PLRC) method with convolutional perfectly matched layered (CPML) absorbing walls integrated with a genetic algorithm (GA) technique can be used in design and optimization of complicated structures and geometries for the present metamaterials. An example of a capable and versatile computation/optimization engine is described in H. Mosallaei and Y. Rahmat-Samii, "Broadband Characterization of Complex Periodic EBG Structures: An FDTD/Prony Technique Based on Split Field Approach," *Electromagnetic Journal*, vol. 23, no. 2, pp. 135-151, February-March 2003, the entire contents of which are incorporated herein by reference.

For fabricating microwave and mm-wave range composite metamaterials with periodic particularity, advanced low temperature co-fired ceramic (LTCC) technology can be used. Such technology is currently used at, for example, the Georgia Institute of Technology in Atlanta. Micro-stereolithography (μSL), in particular an indirect solid free-form fabrication technique, can be applied to form 3D ceramic structures with elements down to several microns. This technique can be employed for fabricating both fractals and periodic lattices composed of alumina, PZT and titanates, for instance. For planar structures, conventional photolithography and plasma etching techniques can be utilized.

For fabricating terahertz (THz) and optical range metamaterials, the smallest required features sizes are about 1 micron to 10 nm, respectively. Planar 2D metamaterial structures in the optical range can be fabricated using, for example, CMOS facilities. In order to fabricate an array of cylindrical holes (or defects) in a Si substrate for operation at optical frequencies, electron beam (E-beam) lithography and plasma dry etching can be utilized. A suitable E-beam machine and high-density (e.g., inductively coupled plasma) and lower-density (e.g., reactive ion etching) plasma sources are in use at, for example, Georgia Institute of Technology. These tools can be used to etch holes into the silicon wafers. It is believed that the sidewall roughness of the holes (or defects) can be reduced by using $Cl_2$-based etch chemistry with low polymer formation as opposed to conventional fluorine-based etch chemistry with high polymer formation. Low-pressure plasmas can be used to maximize the mean-free path and reduce the angular distribution of particles in the plasma, and thereby achieve a substantially vertical etch profile. Other techniques such as oxidation can be used to further smooth the sidewall roughness of the holes. This will result in formation of good cylindrical resonators with desired properties found by the present optimization technique.

For 3D metamaterials in the optical range, a two-photon lithography (TPL) approach can be utilized for fabrication. TPL is a nano-fabrication technique that uses light-activated molecules to create complex patterns with very high resolution (a laser writing process). Inversion of TPL fabricated structures can also be employed. The structures can be inverted into a $SiO_2$ structure and eventually into a Si-based structure using a low pressure chemical vapor deposition (LPCVD) technique.

Both E-beam and multi-photon lithography are point-based fabrication techniques that allow local control of the structural properties. Thus, one can make in principle defects and periodic structures using these approaches.

In one aspect, the present metamaterial arrays can provide improvements in the field of RF and optics for the design of micro- and nano-scale devices offering tailored figure-of-merit. The performance of many electronic and optical devices, such as antennas, filters, multiplexers, scatterers, superdirective antennas, lasers, nanowires, nano waveguides, nano-antennas, FSS, DNG, PBG crystals, and sub-wavelength imaging devices can be improved.

One exemplary application is to embed an antenna inside a negative permittivity or negative permeability material realized using an array of high dielectric particles inside a hemisphere fabricated using stereolithography. The antenna provides an enhanced impedence bandwidth and has a very small size.

In another embodiment, one can use a periodic array of disks and excite one of them as an antenna and use the other elements to offer the proper electric and magnetic metamaterial dipole arrangements to provide high performance phased array antennas.

In the optical region, one can use the array of spheres or disks (double resonant lattices) to achieve double negative metamaterial for super-lensing behaviors. Novel photonic crystals with high resolution imaging behaviors can be realized.

Another application of the present invention is the design of nano-circuit elements in optics.

While the invention has been described in connection with specific methods and apparatus, those skilled in the art will recognize other equivalents to the specific embodiments herein. It is to be understood that the description is by way of example and not as a limitation to the scope of the invention and these equivalents are intended to be encompassed by the claims set forth below.

What is claimed is:

1. A metamaterial array, comprising:
   a matrix; and
   a first set of particles embedded in the matrix, each particle in the first set being substantially identically shaped and having a substantially identical dielectric constant, the particles in the first set having a dielectric constant that is higher than the dielectric constant of the matrix, and the dielectric constant of the particles in the first set is less than about 120.

2. The metamaterial array of claim 1, further comprising:
   a second set of particles embedded in the matrix, each particle in the second set being substantially identically shaped and having a substantially identical dielectric constant, the particles of the second set being different from the particles in the first set by at least one of the particle shape and the particle dielectric constant, the particles in the second set having a dielectric constant that is higher than the dielectric constant of the matrix and is less than about 120.

3. The metamaterial array of claim 2, wherein the two sets of particles form an interlocking lattice of particles embedded in the matrix.

4. The metamaterial array of claim 3, wherein the dielectric constants of the first and second particles are ~100.

5. The metamaterial array of claim 2, wherein the first set of particles provides electric resonance and the second set of particles provides magnetic resonance, and above the resonances the metamaterial is characterized by negative $\in$ and negative $\mu$ behavior.

6. The metamaterial array of claim 2, wherein the dielectric constants of the first and second particles are greater than about 40.

7. The metamaterial array of claim 2, wherein the dielectric constant of the matrix is ~1.

8. The metamaterial array of claim 2, wherein the particles comprise spheres.

9. The metamaterial array of claim 2, wherein the particles comprise disks or cubes.

10. The metamaterial array of claim 2, wherein the particles are closely coupled to increase the material frequency bandwidth.

11. The metamaterial array of claim 1, wherein array is configured so that the particles provide a magnetic resonance and the couplings between particles provide an electric resonance within substantially the same frequency band, and above the resonances the metamaterial is characterized as a backward wave medium with negative $\in$ and negative $\mu$ behaviors.

12. The metamaterial array of claim 11, wherein the dielectric constant of the first set of particles is ~12.5 and the dielectric constant of the matrix is ~1.

13. The metamaterial array of claim 11, wherein the first set of particles comprise gallium phosphide (GaP).

14. The metamaterial array of claim 1, wherein the first set of particles comprises hexaferrite, and the matrix comprises a low dielectric material.

15. The metamaterial array of claim 14, further comprising a dc magnetic bias that tunes the resonant frequency of the particles.

16. The metamaterial array of claim 1, wherein the matrix comprises a ferrite.

17. The metamaterial array of claim 16, wherein the first set of particles comprises a high-dielectric material, the ferrite matrix provides a negative permeability and the first set of particles provides an electric resonant mode, where above the resonance a negative effective permittivity is obtained.

18. The metamaterial array of claim 16, wherein the dielectric constant of the first set of particles is ~100.

19. The metamaterial array of claim 16, further comprising a dc magnetic bias that tunes the resonance of the ferrite matrix.

20. The metamaterial array of claim 1, wherein the first set of particles comprises a multiferroic material, and the matrix comprises a low dielectric material.

21. The metamaterial array of claim 20, further comprising a dc electric field bias that tunes the resonant frequency of the particles.

22. The metamaterial array of claim 1, wherein the matrix comprises a multiferroic material.

23. The metamaterial array of claim 22, wherein the first set of particles comprises a high-dielectric material, the multiferroic material matrix provides a negative permeability and the first set of particles provides an electric resonant mode, where above the resonance a negative effective permittivity is obtained.

24. The metamaterial array of claim 22, wherein the dielectric constant of the first set of particles is ~100.

25. The metamaterial array of claim 22, further comprising a dc electric field bias that tunes the resonance of the multiferroic material matrix.

26. The metamaterial array of claim 1, wherein the particles are closely coupled to increase the material frequency bandwidth.

27. The metamaterial array of claim 1, wherein the particles comprise spheres.

28. The metamaterial array of claim 1, wherein the particles comprise disks or cubes.

29. The metamaterial array of claim 1, wherein the array is isotropic.

30. The metamaterial array of claim 1, wherein the array comprises a three-dimensional (3D) array.

31. The metamaterial array of claim 1, wherein the array comprises a two-dimensional (2D) array.

32. The metamaterial array of claim 1, wherein the array provides negative refraction in an optical range.

33. The metamaterial array of claim 1, wherein the array provides negative refraction in a microwave range.

34. The metamaterial array of claim 1, wherein the array comprises a unit cell comprising multi-resonant particles to enhance the material frequency bandwidth.

35. The metamaterial array of claim 1, wherein the metamaterial array is characterized by an effective permittivity, an effective permeability and a resonance frequency, wherein at least one of the effective permittivity and the effective permeability has a positive value below the resonance frequency and a negative value above the resonance frequency.

36. A method of fabricating a metamaterial array, comprising:
providing a matrix; and
embedding a first set of particles in the matrix, each particle in the first set being substantially identically shaped and having a substantially identical dielectric constant, the particles in the first set having a dielectric constant that is higher than the dielectric constant of the matrix, and the dielectric constant of the particles in the first set is less than about 120.

37. The method of claim 36, further comprising:
embedding a second set of particles in the matrix, each particle in the second set being substantially identically shaped and having a substantially identical dielectric constant, the particles of the second set being different from the particles in the first set by at least one of the particle shape and the particle dielectric constant, the particles in the second set having a dielectric constant that is higher than the dielectric constant of the matrix and is less than about 120.

38. The method of claim 37, wherein the two sets of particles form an interlocking lattice of particles embedded in the matrix.

39. The method of claim 36, wherein the particles comprise spheres.

40. The method of claim 36, wherein the particles comprise disks or cubes.

41. The method of claim 36, wherein the particles comprise gallium phosphide (GaP).

42. The method of claim 36, wherein the particles comprise hexaferrite.

43. The method of claim 36, wherein the particles comprise a multiferroic material.

44. The method of claim 36, wherein the matrix comprises ferrite.

45. The method of claim 36, wherein the matrix comprises a multiferroic material.

46. The method of claim 36, wherein the array comprises a three-dimensional (3D) array.

47. The method of claim 36, wherein the array comprises a two-dimensional (2D) array.

48. The method of claim 36, further comprising performing a stereolithography process to fabricate the metamaterial array.

49. The method of claim 36, further comprising performing a two-photon lithography process to fabricate the metamaterial array.

50. The method of claim 49, further comprising:
modeling the design of a metamaterial as an RLC circuit to provide a desired characteristic;
determining material parameters for the array based on the RLC circuit model; and
fabricating the metamaterial array based on the determined material parameters.

* * * * *

UNITED STATES PATENT AND TRADEMARK OFFICE
CERTIFICATE OF CORRECTION

PATENT NO. : 7,750,869 B2
APPLICATION NO. : 12/220438
DATED : July 6, 2010
INVENTOR(S) : Hossein Mosallaei It is certified that error appears in the above-identified patent and that said Letters Patent is hereby corrected as shown below:

Column 2, line 10, "e and negative p" should read --$\varepsilon$ and negative $\mu$--;

Column 6, line 48, "nth" should read --$n^{th}$--; and

Column 12, claim 50, line 28, "49" should read --36--.

Signed and Sealed this
Eighteenth Day of January, 2011

David J. Kappos
*Director of the United States Patent and Trademark Office*